(12) United States Patent
Baldischweiler et al.

(10) Patent No.: US 10,943,238 B2
(45) Date of Patent: Mar. 9, 2021

(54) TRANSACTION AUTHORIZATION METHOD

(71) Applicant: GIESECKE & DEVRIENT GMBH, München (DE)

(72) Inventors: Michael Baldischweiler, Munich (DE); Claus Dietze, Obersöchering (DE); Martin Auer, Pfeffenhausen (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 856 days.

(21) Appl. No.: 15/120,887

(22) PCT Filed: Jan. 27, 2015

(86) PCT No.: PCT/EP2015/000150
§ 371 (c)(1),
(2) Date: Aug. 23, 2016

(87) PCT Pub. No.: WO2015/124257
PCT Pub. Date: Aug. 27, 2015

(65) Prior Publication Data
US 2016/0371690 A1    Dec. 22, 2016

(30) Foreign Application Priority Data
Feb. 24, 2014  (DE) .................. 10 2014 002 602

(51) Int. Cl.
*G06Q 20/40*    (2012.01)
*G06Q 20/32*    (2012.01)
(Continued)

(52) U.S. Cl.
CPC .......... *G06Q 20/405* (2013.01); *G06Q 20/20* (2013.01); *G06Q 20/202* (2013.01);
(Continued)

(58) Field of Classification Search
CPC .............. G06Q 20/20; G06Q 20/3276; G06Q 20/3278; G06Q 20/3823; G06Q 20/3825; G06Q 20/40; G06Q 20/405
See application file for complete search history.

(56) References Cited

U.S. PATENT DOCUMENTS

2007/0194113 A1*  8/2007  Esplin ................... G06Q 20/10
                                                          235/383
2007/0223685 A1*  9/2007  Boubion ................. G06F 21/31
                                                          380/2
(Continued)

FOREIGN PATENT DOCUMENTS

DE    102010047257 A1    9/2011
DE    102011119441 A1    5/2013
(Continued)

OTHER PUBLICATIONS

Charissa Struble, Benefits of Using a Smart Watch Dec. 6, 2013, SmartWatches.org, https://smartwatches.org/learn/benefits-of-using-a-smartwatch/, p. 1-2 (Year: 2013).*
(Continued)

*Primary Examiner* — Neha Patel
*Assistant Examiner* — Courtney P Jones
(74) *Attorney, Agent, or Firm* — Workman Nydegger

(57) ABSTRACT

A method for authorizing a transaction reading out a first code and a second code by means of a first mobile device. The second code contains information items for decrypting the first code. From the read-out codes a first signature confirming the transaction vis-à-vis the system is generated, which is transmitted to the system. Subsequently, an authorization of the transaction is effected.

13 Claims, 2 Drawing Sheets

(51) Int. Cl.
*G06Q 20/38* (2012.01)
*G06Q 20/20* (2012.01)

(52) U.S. Cl.
CPC ..... *G06Q 20/3276* (2013.01); *G06Q 20/3278* (2013.01); *G06Q 20/3823* (2013.01); *G06Q 20/3825* (2013.01); *G06Q 20/40* (2013.01); *G06Q 20/40145* (2013.01)

(56) References Cited

U.S. PATENT DOCUMENTS

| | | | |
|---|---|---|---|
| 2008/0307515 A1* | 12/2008 | Drokov | G06Q 20/32 726/7 |
| 2009/0254485 A1* | 10/2009 | Baentsch | G06Q 20/02 705/71 |
| 2009/0298534 A1* | 12/2009 | Bushman | G06Q 20/32 455/556.1 |
| 2012/0160912 A1 | 6/2012 | Laracey | |
| 2013/0095755 A1 | 4/2013 | Moreton et al. | |
| 2013/0198078 A1 | 8/2013 | Kirsch | |
| 2013/0290187 A1 | 10/2013 | Itwaru | |
| 2014/0040617 A1 | 2/2014 | Fernandez De Torres et al. | |
| 2014/0172721 A1* | 6/2014 | Weiss | G06F 21/42 705/64 |
| 2014/0244456 A1* | 8/2014 | Huang | G06Q 40/123 705/31 |
| 2015/0095228 A1* | 4/2015 | Su | G06Q 20/12 705/44 |
| 2015/0120568 A1 | 4/2015 | Hagemann et al. | |

FOREIGN PATENT DOCUMENTS

| | | |
|---|---|---|
| DE | 102012003859 A1 | 8/2013 |
| EP | 1802155 A1 | 6/2007 |
| EP | 2654006 A1 | 10/2013 |
| GB | 2478712 A | 9/2011 |
| WO | 2009148802 A1 | 12/2009 |

OTHER PUBLICATIONS

German Examination Report for corresponding German Application No. 102014002602.7.

International Search Report for corresponding International PCT Application No. PCT/EP2015/000150, dated Apr. 8, 2015.

* cited by examiner

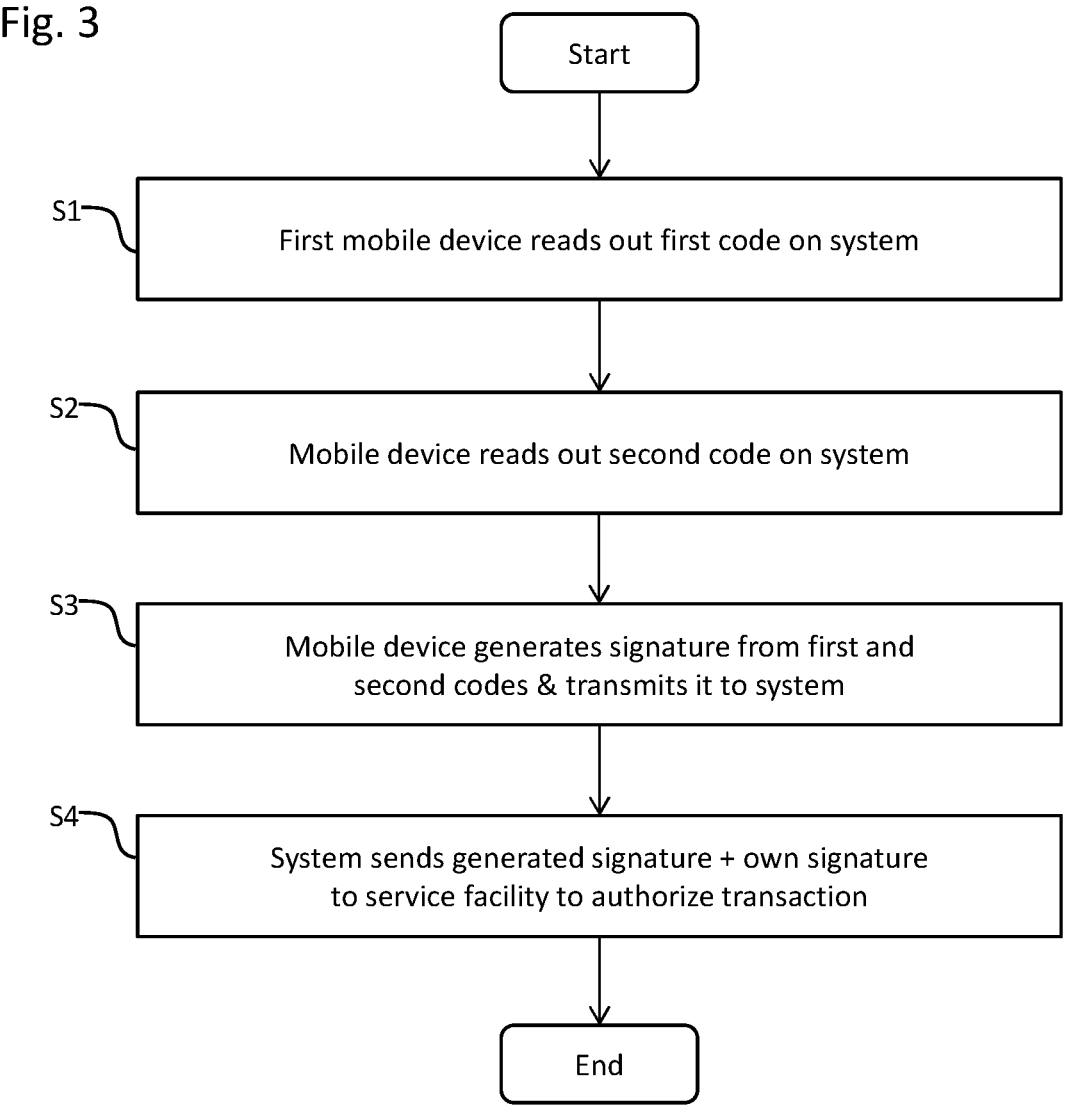

TRANSACTION AUTHORIZATION METHOD

TECHNICAL FIELD

The present invention concerns a method for authorizing a transaction by means of a mobile device, wherein mutually complementary codes are read out and evaluated with the mobile device for authorizing the transaction.

A mobile device may be for example a watch with a digital display device, in particular a smartwatch, a mobile radio device, a tablet PC and/or a PDA (personal digital assistant).

A code may be any kind of machine-readable code, in particular a QR code (Quick Response code), a code capable of being read out by means of a near-field communication interface (NFC according to ISO 14443), a 2D bar code, etc.

PRIOR ART

From DE 2010 047 257 A1 is known a mobile radio-based transaction system wherein a two-factor authentication and a location matching between the location of the subscriber of the mobile radio network and the location of the subscriber within a navigation system (GPS) is performed. In this system the matching of the two locations ensures that the subscriber's location established with the mobile radio network corresponds to the subscriber's real location that is established via GPS.

Further, payment methods such as "Mpass®" are known wherein a point-of-sale system reads out an NFC code from a mobile radio device or an NFC sticker stuck to the mobile radio device in order to authorize a transaction. In dependence on the payable amount, the input of a PIN on the mobile radio device is additionally required.

Further, payment methods are known wherein a QR code dynamically generated on a point-of-sale system is read in with a mobile radio device. For reading in, the mobile radio device employs the built-in camera device. The QR code contains information about the payment to be carried out, which the user thereupon authorizes with his mobile radio device.

Said payment methods have the disadvantage that there is further potential for improving the security level, since in known payment methods only one kind of code must always be read in, which is subject to the risk of having been tampered with. If for example a person acting with an intent to cause damage succeeds in tampering with the point-of-sale system such that it outputs a tampered-with code with changed transaction data, the user will transfer the payable amount to another place after the code is read out.

STATEMENT OF THE INVENTION

The invention is based on the object of providing a method for authorizing a transaction that solves the known problems from the prior art and is further adapted for increasing the security in performing a mobile transaction.

This object is achieved with a method according to independent claim 1. Preferred embodiments of the method according to the invention result from the subclaims.

The invention is based on the idea of employing at least two codes to be read out that are of a different kind for authorizing a transaction on a system, in particular on a point-of-sale system.

Accordingly, the method according to the invention comprises reading out a first code generated by a system for a certain transaction, by means of a first read-out device of a first mobile device, with the first code having been encrypted, reading out a second code which is dedicated to the system and contains at least one information item for decrypting the first code, by means of a second read-out device of the first mobile device which differs from said first read-out device, generating a first signature confirming the transaction vis-à-vis the system from the previously decrypted first code, transmitting the first signature to the system, and transmitting the first signature and a second signature identifying the system from the system to a service facility in order to authorize the transaction.

A "transaction" as intended by the present invention is for example the performance of a payment with the first mobile device on the system. The payment can be debited to the account of the owner of the mobile device by bank transfer or be effected as a credit-card transaction.

A "code" is understood to be any kind of element that can be read out by means of one of the read-out devices provided on a mobile device, such as a camera, an NFC read-out device, or the like. Further examples of codes are given in the description below.

Upon generation of the first signature confirming the transaction vis-à-vis the system, the information items from the two codes are so utilized by means of the mobile device that it is recognizable from the first signature that the mobile device was able to correctly evaluate the two codes and that the first signature stems from the first mobile device. In other words, the first signature can be understood to be a digital signature with which it can be checked whether the first mobile device has actually read out the two codes.

With the second signature identifying the system it is confirmed vis-à-vis the service facility that the signature stems from the system.

The method according to the invention can especially advantageously ensure that the user wishing to perform a transaction is actually located in the vicinity of the system, since he can only decrypt the first code when he reads out the second code.

The first signature can, according to one embodiment, be generated in the first mobile device, in particular in a secure element of the first mobile device. Generating the signature in a secure element can substantially increase the security of the method. The secure element may be a secure region of the first mobile device, which region cannot be tampered with by harmful programs on the mobile device. Alternatively, the first signature may also be generated in a second mobile device, in particular a mobile telephone, which is connected to the first mobile device via the over-the-air interface.

According to a further embodiment, the transmission of the first signature to the system can be effected with the first mobile device and/or a second mobile device to which the first mobile device is connected via an over-the-air interface. The transmission of the first signature to the system with the first mobile device can likewise be effected via an over-the-air interface. The over-the-air interface can respectively be configured as a Bluetooth, wireless LAN or infrared interface. Further, a mobile radio transfer method can be employed for transfer. Employing the over-the-air interface enables a secure and fast transfer.

After completion of the transaction it is possible that the service facility sends verification data confirming and/or summarizing the performance of the transaction to the second mobile device. The verification data may be a list of the purchased goods and the paid amount.

The security of the method according to the invention can be improved further when the first mobile device must be unlocked before readout. This may require a password being inputted to the first mobile device. Alternatively, unlocking the first mobile device may require a biometric authentication feature, such as a fingerprint and/or an iris scan.

According to one embodiment, the system may be a point-of-sale system. A point-of-sale system may be for example the point-of-sale system in a supermarket, a movie theater, a department store and/or a gas station.

The first code may preferably be a two-dimensional code, in particular a QR code, preferably a secure QR code (SQRC). Such codes can be generated by a point-of-sale system very fast and offer high security. Additionally, there are already a plurality of applications with which a QR code can be read out by means of a camera device of the first mobile device.

The second code may be an NFC code according to ISO 14443, which is preferably provided on the system as a so-called NFC sticker, i.e. in the form of an adhesive label.

According to a particularly preferred embodiment, the first mobile device is a watch with a display device, in particular a smartwatch. This enables an especially simple authorizing of the transaction, since the wearer of the smartwatch wears it on his wrist and therefore always has it handy.

According to a further particularly preferred embodiment, it is provided that before the generating of the signature on the first mobile device the transaction data are rendered on a display device of the first and/or the second mobile device. When the transaction data correspond to the expected transaction data, the user can authorize or confirm the transaction, and the signature is then generated. This additionally increases the security, since the transaction data are displayed to the user again before the transaction is performed. Therefore, errors in the performance of the transaction can be avoided. For example, this avoids a wrong amount or unexpected amount being debited.

The invention further provides for the use of a watch (first mobile device) with a display device, in particular a smartwatch, with a first and a second read-out device in a method according to any of the preceding claims.

Further, the invention provides for the use of a point-of-sale system which is configured for rendering a first code generated by a system for a certain transaction and a second code which is dedicated to the system and has an information item for decrypting the first code.

BRIEF DESCRIPTION OF THE DRAWINGS

FIG. 3 shows a flowchart representing the sequence of a method according to the invention for authorizing a transaction.

DETAILED DESCRIPTION OF PREFERRED EMBODIMENTS OF THE INVENTION

Hereinafter the invention will be explained more closely with reference to embodiments represented by way of example in FIGS. 1 to 3.

Figure 1:
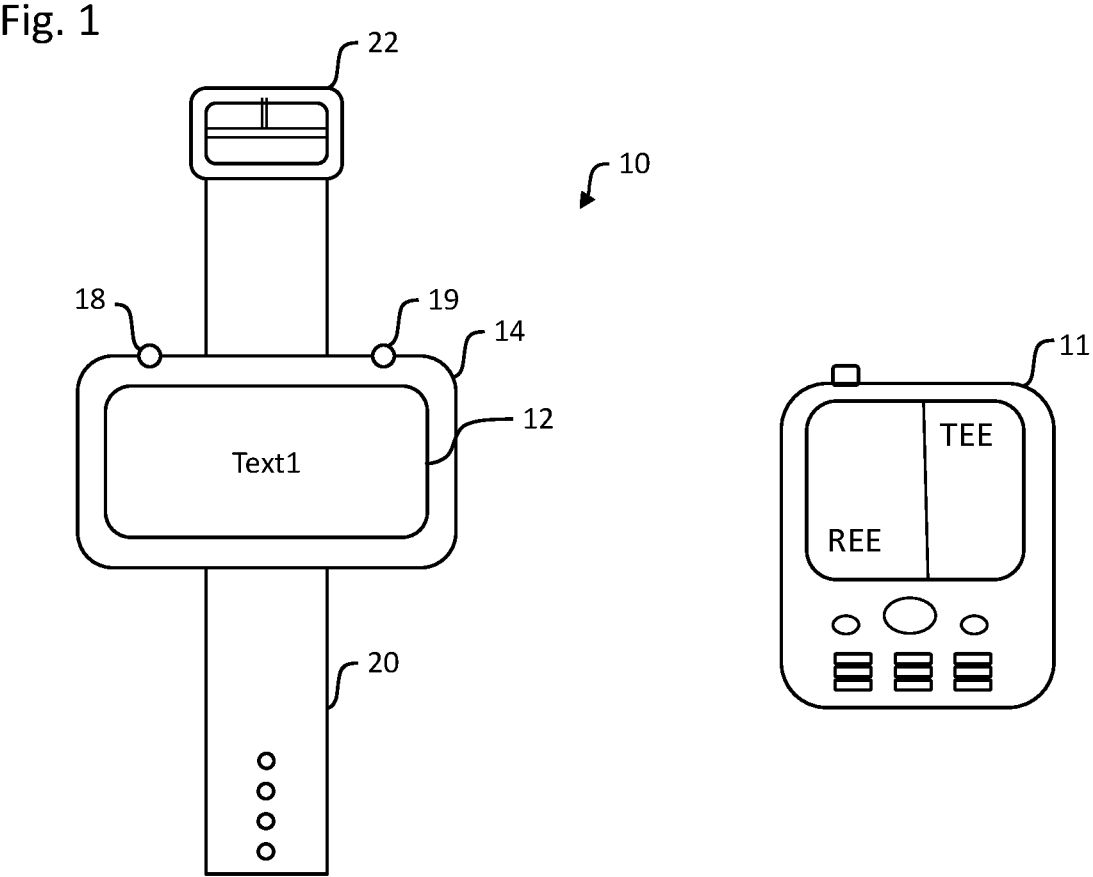
FIG. 1 shows a schematic representation of a first mobile device according to the invention and a second mobile device.

FIG. 1 shows a first device 10 in the form of a watch with a display device 12. Watches 10 with a display device 12 are also designated, inter alia, as smartwatches. The first device 10 is fastenable to a wearer's wrist with a wristband 20 and a closure device 22. Other ways of wearing, such as by means of a chain at the neck or at the ankle, are likewise possible. The display device 12 of the mobile device 10 is surrounded by a housing 14 or frame. On the housing 14 there can further be provided an on/off switch (not shown) as well as further switches. Additionally, there are provided on the housing 14 a first read-out device 18 and a second read-out device 19. The first read-out device 18 is, in the shown embodiment example, a camera device with which a first code 28 (QR code) can be read out. The second read-out device 19 is a read-out device for reading out NFC stickers 29.

Figure 2:
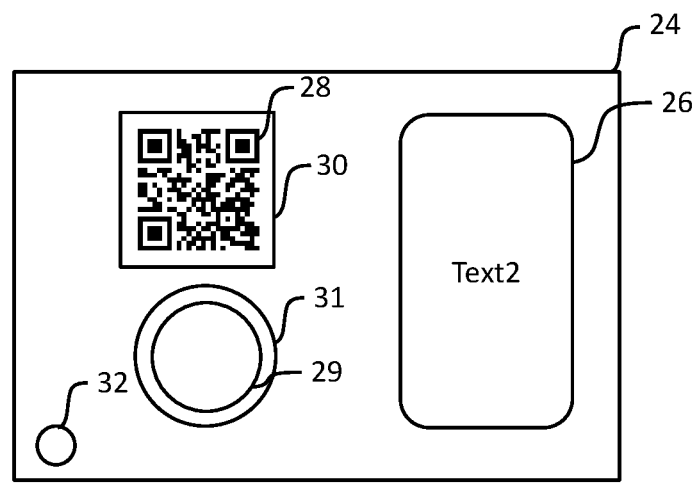
FIG. 2 shows a system according to the invention.

FIG. 2 shows a system 24 according to the invention. The system 24 is a point-of-sale system in the shown embodiment example. The system 24 is provided with a display device 26 in the shown embodiment example. On the display device 26 there can be rendered for example a payable amount and/or further information items, such as the purchased articles. Further, the system 24 is provided with means for making the first code 28 and the second code 29 accessible. The first code 28 is rendered on a display device 30 for a QR code in the shown embodiment example.

The second code 29 is, in the shown embodiment example, deposited in an NFC sticker 31 and can be read out with any NFC-capable reader.

For authorizing a transaction, in particular a transaction by which money is transferred, it is provided that the read-out device 18 reads out a code 28 generated by the system 24 for the transaction. Further, the second code 29 is read out with the second read-out device 19. This can be effected at the same time as the readout of the first code 28 or shortly therebefore or thereafter. The second code 29 is a static code. In the shown embodiment example the static code is stored in an NFC sticker. The second code 29 contains information items for decrypting (decoding) the first code 28. Without the second code 29 it is not possible to utilize the first code 28, since only the second code contains an information item for decrypting the first code 28.

The read-out transaction data can be rendered on the display device 12 of the mobile device 10 after the readout of the two codes 28, 29. Alternatively, the transaction data can be rendered on a second mobile device 11 coupled with the mobile device 10, for example a smartphone or a tablet PC. The user can then check the rendered transaction data and, if they match the desired transaction, authorize by performing a confirming action. A confirming action may be for example to click on a confirmation message on the display device of the first or second mobile device.

After the user has confirmed the transaction, the first mobile device 10 and/or the second mobile device 11 generates a first signature. The first signature can be generated for example by means of a manual or automated PKI method (e.g. X.509). The first signature incorporates for example the account data of the account to which the amount to be transferred is to be debited. The signature makes it possible for the point-of-sale system 24 or a service facility connected to the point-of-sale system 24 to check from whom the payment stems. The digital signature might incorporate for example at least one element of the following list: account data, bank, age, photo, signature, telephone number, marital status, etc. The transmitted information items must enable the point-of sale system 24 to authenticate the user or the first mobile device 10.

The transmission of the first signature to the system 24 can be effected via an over-the-air interface of the first mobile device 10 or of the second mobile device 11, e.g. by Bluetooth, wireless LAN or over the mobile radio network. Alternatively, there can be rendered on a display device of the two mobile devices a code, in particular a QR code, which is capable of being read out with a read-out device 32 of the system 24. The read-out device 32 may be a camera device which is configured for reading out a QR code which is rendered on one of the two mobile devices.

The system 24 receives the signature, evaluates it, where applicable, and transmits it together with a second signature identifying the system 24 to a service facility (not shown) in order to authorize the transaction. The service facility may be for example a financial institution, in particular a credit-card company.

After the transaction has been performed, the service facility can send verification data confirming the execution of the transaction to the second mobile device 11. For this purpose, an e-mail can be employed. Alternatively, the verification data can be rendered in a banking application.

To make the method more secure, it may be provided that the display of the first mobile device 10 and/or of the second mobile device 11 must be unlocked before the readout of the codes 28, 29. Unlocking the respective mobile device is effected by means of known methods, such as inputting a password and/or furnishing a biometric authentication feature (fingerprint, iris). For capturing the biometric authentication feature, corresponding sensors known in the prior art can be provided on the first mobile device 10 and/or the second mobile device 11.

Summing up, as shown in FIG. 3, the method according to the invention proceeds such that in a first step S1 the first mobile device 10 with the first read-out device 18 first reads out a first code 28 on a system 24. The first code 28 is configured as a QR code 28 in the shown embodiment example. Subsequently or simultaneously, the mobile device 10 reads out the second code 29 from the system 24 in the step S2. The second code 29 contains information items for evaluating the first code 28. In the shown embodiment example the second code 29 is configured as an NFC code. Alternatively, it is possible that the first code 28 contains information items for evaluating the second code 29. In the next step S3 the mobile device 10 generates a signature from the first 28 and second 29 codes as well as from the bank data of the owner of the mobile device 10 and transmits said signature to the system 24. The bank data of the owner of the first mobile device 10 are stored in the first mobile device 10. In a next step S4 the system 24 sends the generated signature as well as a signature of its own to a service facility in order to authorize the transaction.

LIST OF REFERENCE SIGNS

10 First mobile device
11 Second mobile device
12 Display device
14 Housing
18 First read-out device
19 Second read-out device
20 Wristband
22 Closure
24 System
26 Display device
28 First code
29 Second code
30 Display device for a code
31 NFC sticker
32 Read-out unit
S1 . . . S4 Method steps

The invention claimed is:

1. A method for authorizing a transaction, the method comprising:
reading out a first code generated by a system for the transaction, by a first reader of a first mobile device, with the first code having been encrypted,
reading out a second code, which is dedicated to the system and has at least one information item for decrypting the first code, the second code being read out by a second reader of the first mobile device,
generating a first signature confirming the transaction by way of the system from the previously decrypted first code,
transmitting the first signature to the system, and
transmitting the first signature and a second signature identifying the system to a service facility in order to authorize the transaction.

2. The method according to claim 1, wherein the first signature is generated in the first mobile device, in particular in a secure element of the first mobile device.

3. The method according to claim 1, wherein the transmission of the first signature to the system is effected with the first mobile device and/or a second mobile device to which the first mobile device is connected via an over-the-air interface.

4. The method according to claim 3, wherein the transmitting of the first signature to the system is effected via an over-the-air interface including a Bluetooth, wireless LAN, infrared and/or mobile radio interface.

5. The method according to claim 1, wherein the service facility sends verification data confirming the execution of the transaction to a second mobile device.

6. The method according to claim 1, wherein the first mobile device must be unlocked before readout such that the first mobile device must be unlocked by input of a password and/or by furnishing of a biometric authentication feature.

7. The method according to claim 1, wherein the system is a point-of-sale system.

8. The method according to claim 1, wherein the first code is a two-dimensional code including a secure QR code.

9. The method according to claim 1, wherein the second code is an NFC code according to ISO 14443.

10. The method according to claim 1, wherein the first mobile device is a watch, in particular a smartwatch.

11. The method according to claim 1, wherein before the generating of the signature on the first mobile device transaction data are rendered on a display device of the first and/or the second mobile device.

12. The method according to claim 1, wherein a smartwatch is used in the reading out of the first code and the reading out of the second code, the smartwatch including the first reader and the second reader.

13. The method according to claim 1, wherein the system is a point-of-sale system that generates the first code generated for the transaction and the second code, wherein the point-of-sale system is dedicated to the system and has the at least one information item for decrypting the first code.

* * * * *